(12) United States Patent
Gohari

(10) Patent No.: US 6,778,950 B2
(45) Date of Patent: Aug. 17, 2004

(54) TRANSLATION ARRANGEMENT

(76) Inventor: Benyamin Gohari, 5/25 Sulam Yaakov Street, Jerusalem (IL), 97729

( * ) Notice: Subject to any disclaimer, the term of this patent is extended or adjusted under 35 U.S.C. 154(b) by 694 days.

(21) Appl. No.: 09/731,600

(22) Filed: Dec. 7, 2000

(65) Prior Publication Data

US 2002/0077804 A1 Jun. 20, 2002

(51) Int. Cl.⁷ .............................................. G06F 17/28
(52) U.S. Cl. ........................................................ 704/2
(58) Field of Search .................... 704/2–10, 1; 707/531

(56) References Cited

PUBLICATIONS

"The Way International", Aramaic–English Interlinear New Testament, Published 1988, American Christian Press, First Edition, Preface vii, p. 87.*
John R. Kohlenberger, III, Editor, "The Interlinear NIV Hebrew—English Old Testament," sample page and back cover (1993).

Green, J. (editor), *The Interlinear Hebrew/Greek English Bible*, vol. 1, Chapter 1 (Genesis–Ruth), pp. 1–3 (1976).

* cited by examiner

Primary Examiner—Talivaldis I. Šmits
Assistant Examiner—Lamont Spooner
(74) Attorney, Agent, or Firm—Marshall, Gerstein & Borun LLP

(57) ABSTRACT

A method for arranging a first text in a first language having a first direction and comprising a plurality of meaningful units, and a translation of the first text into a second text in a second language having a second, opposite, direction and comprising a plurality of translation units, each of the translation units being a translation of a corresponding meaningful unit of the first text. The method includes positioning the first and second texts such that the first text reads in the first direction, and the translation units of the second text, each reading in the second direction, are positioned vertically adjacent to the corresponding meaningful units of the first text, surrounding at least one translation unit with a first type of grouping symbols, and positioning directionality symbols indicating the first direction between horizontally adjacent translation units of the second text.

18 Claims, 2 Drawing Sheets

FIG. 1

GENESIS

GENESIS

CAPUT. I א

CHAPTER 1

CHAPTER 1

[1] In the beginning God created the heavens and the earth; [2] and earth being without form and empty, and darkness on the face of the abyss, and the Spirit of God moving on the face of the waters. [3] then God said, Let light be; and there was light. [4] And God saw the light, that (it was) good, and God separated between the light and the darkness, [5] and God called the light, Day; and He called the darkness, Night; and there was evening and there was morning the first day.

1
2   the and      the       and      the         God    created    the In
    earth,      :earth             heavens                        beginning God       the and    the    the   on    and     and   without   was
              of Spirit  :deep  watery of  darkness ,empty  form 3   and  light  Let   ,God   said Then   the      the     on moving
    was        be                       .waters of face     gently 4   be-  God    and     good that   light the    God   saw And  ,light
    tween        separated  (was it)

5   the and  ,Day  light the    God     called And      the     and      the
    darkness                                           ,darkness       light .one    day    mor-   and eve-   and  ;Night  He
                                                 ning   was ,ning  was         called

[6] And God said, Let an expanse be in the midst of the waters, and let it divide the waters from the waters, [7] And God made the expanse, and divided the waters which were under the expanse from the waters which were above the expanse. And it was so.

6   be-  (he)   and    the     the in    an  be Let  ,God   said And
    tween dividing  it let  ,waters of midst expanse 7   the between He and    the         God    And the (and) waters
    waters     separated ,expanse                made .waters it and    the     above   which  the   and    the    under   which
    was    ,expanse          (were) waters       expanse        (were)

[8] And God called the expanse, Heavens. And there was evening and there was morning the second day. [9] And God said, Let the waters under the heavens be collected to one place, and let the dry land appear. And it was so.

8   mor- and   eve-   and  ;Heavens  the      God     And    ,so
    ning was  ,ning   was           expanse           called .second day 9   ,one   place   to   the    under   the   be Let  ,God   said And
                       heavens        waters collected

[10] And God called the dry land, Earth. And He called the collection of the waters, Seas. And God saw that (it was) good. [11] And God said, Let the 10  ,Earth  dry the       God    And    ,so was it   dry the    let and
             land               called              ;land       appear 11  said And   good      God    and  ,Seas   He     the      the and
              .(was it)         saw        called waters of collection

FIG. 2

וְהֶגְיוֹן      אִמְרֵי    פִי       יִהְיוּ לְרָצוֹן
=(and the thought of)=(my mouth)=(the words of)=   =(Let find favor)

צוּרִי וְגֹאֲלִי:   יְהֹוָהאדני.    לְפָנֶיךָ.  לִבִּי
=(and my redeemer.)=(my might)=(Hashem)=(before You)=(my heart)

מִדַּבֵּר       וּשְׂפָתוֹתַי.   לְשׁוֹנִי מֵרָע.  נְצֹר   אֱלֹהַי.
=(from speaking)=(and my lips)=(from evil)=(my tongue)=(guard)=(My God)

תִּדֹּם.      נַפְשִׁי      וְלִמְקַלְלַי.        מִרְמָה.
=(be silent.)= (let my soul)=(And to those who curse me)=  =(deceitfully.)

לִבִּי    פְּתַח     תִּהְיֶה. לַכֹּל   כֶּעָפָר    וְנַפְשִׁי
=(my heart)= (open)=    (be like the dust to all)=  =(And let my soul)

תִּרְדֹּף     מִצְוֹתֶיךָ      וְאַחֲרֵי        בְּתוֹרָתֶךָ.
=(let pursue)= (Your commandments)=(And after)=  =(to Your Torah.)

לְרָעָה.       עָלַי    הַקָּמִים       וְכָל     נַפְשִׁי.
=(to do evil)= (against me)= (who rise up)=  (And any one)  =(my soul)

מַחֲשְׁבוֹתָם.     וְקַלְקֵל    עֲצָתָם      הָפֵר     מְהֵרָה
=(their thoughts.)=   (and ruin)=  (their consultation) =(nullify)= =(soon)

עֲשֵׂה       שְׁמֶךָ.    לְמַעַן         עֲשֵׂה
=(Do it)    =(Your name)  =(for the sake of)  =(Please do my inquiry)

תּוֹרָתֶךָ.   לְמַעַן   עֲשֵׂה    יְמִינֶךָ.   לְמַעַן
=(Your Torah)= (for the sake of)= (Do it)=(Your Yemin) =(for the sake of)

TRANSLATION ARRANGEMENT

FIELD OF THE INVENTION

The present invention relates to the field of arranging translations, particularly interlinear translations of two languages that read in opposite directions.

BACKGROUND OF THE INVENTION

There are many different ways of arranging a page to display a translation from one language to another, the simplest of which being simply displaying the two languages adjacently. Such layouts, however, do not answer the demands of readers who wish to know how each word and phrase in the translation corresponds to that of the original language. Such a translational correspondence may be word-for-word, word-for-phrase or phrase-for-phrase correspondence. Interlinear translations, where lines of original text are interspersed with lines of the translation, do provide such a translational correspondence between the original text and its translation. An interlinear arrangement of a text in a first language, and its translation into a second language running in the same direction as the first language, can provide both translational correspondence between the two texts while maintaining the natural direction of both languages and hence the readability of both texts.

Many languages, such as English, are written and read from left to right across a page. Some languages, such as Hebrew, Arabic, Aramaic, Urdu, Farsi and Syriac are written and read in the right to left direction. The interlinear arrangement of the translation of a left to right language to a right to left language, or vice versa, is particularly problematic. In such an instance, if translational correspondence between the original text and its translation is maintained, the natural direction of the translation language is lost, reducing the readability of the translated text.

Reference is now made to FIG. 1, which is a page of the prior art arrangement of an interlinear translation of the first page of the Hebrew Bible into English, taken from The Interlinear Hebrew-Greek-English Bible, Jay P. Green, Sr., Editor, published by Associated Publishers and Authors, USA. In FIG. 1, the Hebrew text is written in its normal right to left direction, and each meaningful unit in the Hebrew, typically a single word, but sometimes more than one word, has its corresponding English translation positioned below it., thus providing translational correspondence between the two texts. As shown in FIG. 1, the first meaningful unit of the bible in Hebrew is the word בראשית which is translated as "In the beginning". The translation unit "In the beginning" is placed beneath the Hebrew word, and split onto two lines. As can be clearly seen, within the translation unit, the English phrase is written from right to left, i.e. "the in", and not "in the" beginning. The prior art arrangement of FIG. 1 does not maintain the natural direction of the language of translation, reducing the readability of the translated text.

There has been a long-felt need in the art for a method of arranging a translation of a right to left language into a left to right language, and vice versa, on a page whereby translational correspondence between the original text and its translation are maintained, while maximizing the readability of the translated text.

The disclosures of each of the publications mentioned in this section and in other sections of the specification, are hereby incorporated by reference, each in its entirety.

SUMMARY OF THE INVENTION

The present invention seeks to provide a new method for the interlinear arrangement of a first text and its translation into a second language running in the opposite direction from the direction of the language of the first text, in which the translational correspondence between the first text and its translation are maintained, and the readability of the translated text is maximized. The present invention minimizes the major drawbacks associated with prior art interlinear translations, in that the maintenance of translational correspondence between the first text and its translation causes the translated text to be positioned against the natural direction of the language of the translated text. The methods of the present invention, particularly surrounding translation units with grouping symbols, and providing directionality symbols between the translation units, maximize the readability of the translated text, especially in an interlinear arrangement.

There is thus provided in accordance with a preferred embodiment of the present invention, a method for arranging a first text in a first language having a first direction and comprising a plurality of meaningful units, and a translation of the first text into a second text in a second language having a second, opposite, direction and comprising a plurality of translation units, each of the translation units being a translation of a corresponding meaningful unit of the first text. The method includes positioning the first and second texts such that the first text reads in the first direction, and the translation units of the second text, each reading in the second direction, are positioned vertically adjacent to the corresponding meaningful units of the first text. The method further includes surrounding at least one translation unit with a first type of grouping symbols, and positioning directionality symbols indicating the first direction, between horizontally adjacent translation units of the second text.

Further in accordance with a preferred embodiment of the present invention, the first language may be either a textual language which is comprised of words, or an ideographic language which is comprised of ideograms. Independently, the second language may also be either a textual language which is comprised of words, or an ideographic language which is comprised of ideograms.

Still further in accordance with a preferred embodiment of the present invention, when the first language is a textual language, the meaningful units of the first text are single words or groups of more than one word. In an alternative embodiment, when the first language is an ideographic language, the meaningful units of the first text are single ideograms or groups of more than one ideogram.

Additionally in accordance with a preferred embodiment of the present invention, when the second language is a textual language, the translation units of the second text are single words or groups of more than one word. In an alternative embodiment, when the second language is an ideographic language, the translation units of the second text are single ideograms or groups of more than one ideogram.

Also in accordance with a preferred embodiment of the present invention the step of surrounding at least one translation unit with a first type of grouping symbols comprises surrounding only those translation units comprising more than one word or ideogram, leaving single words or ideograms unsurrounded.

Further in accordance with a preferred embodiment of the present invention the step of surrounding at least one translation unit with a first type of grouping symbols comprises surrounding all the translation units.

Additionally in accordance with a preferred embodiment of the present invention the meaningful units of the first text are translationally correlated with at least one corresponding word or ideogram of the translation, to form translation units in the second text corresponding to the meaningful units of the first text.

Still further in accordance with a preferred embodiment of the present invention at least one word or ideogram of the translation is translationally correlated with the meaningful units of the first text, to form translation units in the second text corresponding to the meaningful units of the first text.

Additionally in accordance with a preferred embodiment of the present invention, the meaningful units of the first text are surrounded with a second type of grouping symbols, different from the first type of grouping symbols surrounding the translation units of the second text. Still further in accordance with a preferred embodiment of the present invention the first and second types of grouping symbols may be selected from { }, ( ), [ ], < >, ⌒, ⌣, | |, ⌈ ⌉, ⌊ ⌋, ⟨ ⟩, ⊂ ⊃, ⌊ ⌋, ⌈ ⌉, ⌐ ¬, " ", ' ', or / \.

Also in accordance with a preferred embodiment of the present invention the translation units of the second text are positioned beneath the corresponding meaningful units of the first text. In an alternative embodiment, the translation units of the second text are positioned above the corresponding meaningful units of the first text.

Further in accordance with a preferred embodiment of the present invention the first and second texts are positioned interlinearly.

Still further in accordance with a preferred embodiment of the present invention the direction of the first language is left to right and the direction of the second language is right to left, and the directionality symbols positioned between adjacent translation units of the second text indicate the left to right direction. Preferably left to right indicating directionality symbols are selected from →, ⇒, », or >.

Additionally in accordance with a preferred embodiment of the present invention the direction of the first language is right to left and the direction of the second language is left to right, and the directionality symbols positioned between adjacent translation units of the second text indicate the right to left direction. Preferably right to left indicating directionality symbols are selected from ←, ↵, ⇐, ⟨, «, or <.

In a preferred embodiment, left to right languages include languages such as Latin, Slavic and Cyrillic languages including, but not limited to English, Spanish, Portuguese, German, French, Italian, Polish, Dutch and Russian. Right to left languages include Semitic languages such as Hebrew, Arabic, Aramaic, Farsi and Syriac.

Also in accordance with a preferred embodiment of the present invention the first text is the Old Testament and the first language is Hebrew which has a right to left direction.

BRIEF DESCRIPTION OF THE DRAWINGS

The present invention will be understood and appreciated more fully from the following detailed description, taken in conjunction with the drawings in which:

FIG. 1 shows a prior art interlinear arrangement of a translation of the Hebrew bible into English; and FIG. 2 shows an interlinear translation of a Hebrew prayer into English, arranged in accordance with a preferred embodiment of the present invention.

DETAILED DESCRIPTION OF PREFERRED EMBODIMENTS

Reference is now made to FIG. 2 which is an interlinear translation of a Hebrew prayer into English, arranged in accordance with a preferred embodiment of the present invention. Shown is the Hebrew original text running from right to left, with an interlinear English translation thereof positioned beneath the Hebrew.

In a preferred embodiment, the English translation of each original Hebrew word is typically positioned below the corresponding Hebrew word, and preferably does not extend to lie underneath the adjacent Hebrew word.

In many cases, one word of the original Hebrew is translated into more than one English words. For example, the first Hebrew word of the bible, the single Hebrew word בראשית is translated as "In the beginning". Thus in the preferred embodiment shown below, the phrase "In the beginning" is placed directly under the Hebrew word from which it is translated.

בראשית
(In the beginning)

In accordance with a preferred embodiment of the present invention the English translation of an original Hebrew word is surrounded by grouping symbols, to denote that the translation unit, i.e., the word or group of words, within the grouping symbols is the translation of the Hebrew word above it. Grouping symbols are typically mirror-image pairs of symbols, and include, but are not limited to, pairs of symbols such as { }, ( ), [ ], < >, ⌒, ⌣, | |, ⌈ ⌉, ⌊ ⌋, ⟨ ⟩, ⊂ ⊃, ⌊ ⌋, ⌈ ⌉, " ", ' ' and / \. Preferably, the use of punctuation symbols that are commonly found in the translated language, such as "" and '' in English, is avoided as grouping symbols. Alternatively, the grouping symbols positioned around the translation units may be unmatched pairs, e.g. "{In the beginning]". Further alternatively, a grouping symbol may be positioned on only one side of the translation units.

בראשית
In the beginning]

In accordance with a preferred embodiment of the present invention, the translation units may be indicated by shading the background page color around the translation unit. Typically on a white page, such shading would comprise graying a block of the page on which the words or the translation unity are written.

Alternatively, the space between the translation units could be colored or grayed in order to group the translation units.

In accordance with another preferred embodiment, the English translation of an original Hebrew word is positioned within a large enclosing symbol such as, but not limited to, a box, oval, or large arrow, to denote that the translation unit, i.e., the word or group of words, within the grouping symbols is the translation of the Hebrew word above it.

בראשית
| In the beginning |

In a preferred embodiment the enclosing symbol is a joint enclosing/directionality symbol, such as but not limited to, an arrow. Preferably the symbol indicates the direction of the language of the original text, which is opposite to that of direction of the language of the translation. Typically, if the enclosing symbol is an arrow indicating the direction of the language of the original text, then directionality symbols between individual translation units, as described hereinbelow, are not required.

Additionally or alternatively, a joint enclosing/directionality indicator may be a colored or grayed-out area of the page background around the translation unit in the shape of directionality indicating symbol such as an arrow.

Optionally and alternatively, if a single word in the original Hebrew is translated into a single word in the English, the single translated word may not be surrounded by grouping symbols. The second Hebrew word of the bible, ברא is translated as "created", and in preferred embodiments, may be written as either ברא    or    ברא
   created         (created)

In accordance with a preferred embodiment of the present invention, when a meaningful unit in the original language, such as a single word or phrase, is translated by a translation unit consisting of plurality of words in the second language, the plurality of translated words are written in the natural direction of the translated language.

If the English translation is much longer than the original Hebrew word, typically the gaps between the original Hebrew words are increased to provide space for the translation below. Additionally or alternatively, the font of the translation is reduced in size to accommodate its position under a single original word. Further additionally or alternatively, the translated phrase may be split onto two lines beneath the Hebrew word to avoid excessive gap size in the Hebrew, or the use of an excessively small font in the English.

The original Hebrew text is written from right to left, and so the second word in the Hebrew is written on the left of the first word. The English translation of the second word is placed below the Hebrew, to the left of the translation of the first word, i.e. in the right to left direction. As the natural direction of English is left to right, the translation of the second word is not in a position to be easily read in the natural direction of the translated language.

בראשית      ברא
  (In the beginning)  ⇐  (created)

In accordance with a preferred embodiment of the present invention, a directionality symbol is inserted between the grouped English translations of each Hebrew word to indicate the direction, and hence order, in which the translation units should be read. The directionality symbol used to indicate the order of reading the translation units, indicates the opposite direction to that of the natural reading of the translation language.

Directionality symbols include any types of graphics or symbols that aid a reader to read the translation units of the translated text in the direction opposite to the normal direction of that language. Such symbols include but are not limited to, symbols such as ←, ↵, ⇐, ⟨,⟪, and <, as well as their mirror image symbols, used to indicate the opposite direction →, ⇒, ⟫, and >. It is appreciated that the symbols used as directionality symbols are preferably different from the symbol used as grouping symbols.

In some cases, a phrase (more than one word) of the original Hebrew is translated into one word or a phrase of English. The English word or phrase translation is preferably positioned below the Hebrew phrase, and preferably without the Hebrew extending to lie over the English translation of the adjacent Hebrew word. In a preferred embodiment, the Hebrew phrase is surrounded by grouping symbols to denote that the entire phrase is translated by the English translation below it. For example. the fourth and fifth Hebrew words of the bible, את השמים, is translated as "the heavens", and in preferred embodiments, may be written as either:

את השמים    or    ⟨את השמים⟩
   (the heavens)         (the heavens)

Preferably, different grouping symbols are used to group an original Hebrew phrase than are used to group the translation. In an alternative embodiment, the Hebrew phrase is not surrounded by grouping symbols.

In another preferred embodiment, a single set of grouping symbols can be used to group both translation units of the translated text and the meaningful units of the original text together.

| את השמים |
    | the heavens |

Alternatively, the symbols surrounding both the original and its translation do not extend the entire height of both texts.

| את השמים |
    | the heavens |

It is appreciated that while directionality symbols may be placed between the original Hebrew words and phrases to indicate the direction of reading, they are typically not required as the original Hebrew is written in its natural direction. Preferably, different directionality symbols are used to indicate the direction of reading the original Hebrew text than are used to indicate the direction of reading of the translation.

It is appreciated that the present invention is not limited to an arrangement of a translation positioned beneath the original language, but is equally applicable to a translation positioned above the original language.

The method of arranging a translation has been described hereinabove with relation to arranging the translation of a right to left language, i.e. Hebrew, into a left to right language, i.e. English. It is appreciated however, that the methods of the present invention are not limited to arranging an English to Hebrew translation, nor to a translation of a right to left language into a left to right language. The methods of the present invention are applicable for arranging a text in any language and its translation into a language running in the opposite direction from the first language.

It is appreciated that when a left to right language is translated into a right to left language, e.g from English to Hebrew, the directionality symbols are used in the opposite direction from that described hereinabove with relation to the arrangement of a translation from Hebrew to English.

It is appreciated that the methods of the present invention include the use of grouping symbols to group translation units as described hereinabove, without the use of directionality symbols between translation units.

It is further appreciated that the methods of the present invention include the use of directionality symbols between translation units for indicating the direction and order of reading translation units as described hereinabove, without the use of grouping symbols to group translation units.

It is still further appreciated that the methods of the present invention include the use of a single type of symbol to group translation units, and to indicate the direction and order of reading translation units as described hereinabove.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A method for arranging a first text in a first language having a first direction and comprising a plurality of meaningful units and a translation of the first text into a second text in a second language having a second, opposite, direction and comprising a plurality of translation units, each of the translation units being a translation of a corresponding meaningful unit of the first text, the method comprising:

positioning the first and second texts such that the first text reads in the first direction, and the translation units of the second text, each reading in the second direction, are positioned vertically adjacent to the corresponding meaningful units of the first text so that the order of reading said plurality of translation units is constantly in said first direction; and positioning arrow-type directionality symbols constantly indicating said first direction between horizontally adjacent translation units of the second text.

2. A method according to claim 1 wherein each of the first and second languages, independently, is a textual language comprising words, or an ideographic language comprising ideograms.

3. A method according to claim 2 wherein each meaningful unit in the first text comprises at least one word or at least one ideogram.

4. A method according to claim 2 wherein each translation unit in the second text comprises at least one word or at least one ideogram.

5. A method according to claim 4 also comprising surrounding translation units comprising more than one word or ideogram with a pair of grouping symbols.

6. A method according to claim 5 wherein the pair of grouping symbols comprise { }, ( ), [ ], < >, ⌒, ⌣, | |, ⌈ ⌉, ⌊ ⌋, ⟨ ⟩, ⊂ ⊃, ¦ ¦, ⌣, ⌒, " ", ' ', or / \.

7. A method according to claim 2 and also comprising the step of correlating at least one word or ideogram of the translation with the meaningful units of the first text, to form translation units in the second text corresponding to the meaningful units of the first text.

8. A method according to claim 2 and also comprising the step of correlating the meaningful units of the first text with at least one corresponding word or ideogram of the translation, to form translation units in the second text corresponding to the meaningful units of the first text.

9. A method according to claim 1 wherein the at least one translation unit comprises all translation units.

10. A method according to claim 1 and also comprising the step of surrounding meaningful units of the first text with a pair of grouping symbols.

11. A method according to claim 1 wherein the translation units of the second text are positioned beneath the corresponding meaningful units of the first text.

12. A method according to claim 1 wherein the translation units of the second text are positioned above the corresponding meaningful units of the first text.

13. A method according to claim 1 wherein said first and second texts are positioned interlinearly.

14. A method according to claim 1 wherein the first direction is left to right and the second direction is right to left.

15. A method according to claim 14 wherein the directionality symbols positioned between adjacent translation units of the second text comprise →, ⇒, ⟩⟩, or >.

16. A method according to claim 1 wherein the first direction is right to left and the second direction is left to right.

17. A method according to claim 16 wherein the directionality symbols positioned between adjacent translation units of the second text comprise ←, ↵, ⇐, ⟨, ⟨⟨, or <.

18. A method according to claim 16 wherein the first text is the Old Testament and the first language is Hebrew.

* * * * *